Aug. 8, 1972 R. A. CLEARY ET AL 3,682,743
LABELLING MACHINE FOR PRESSURE SENSITIVE LABELS
Filed May 22, 1970 7 Sheets-Sheet 1

INVENTORS.
ROBERT A. CLEARY
PAUL R. MORT, JR.

BY Roylance, Abrams, Kruger, Berdo & Kahl
ATTORNEYS.

Aug. 8, 1972 R. A. CLEARY ET AL 3,682,743
LABELLING MACHINE FOR PRESSURE SENSITIVE LABELS
Filed May 22, 1970 7 Sheets-Sheet 2

INVENTORS.
ROBERT A. CLEARY
PAUL R. MORT, JR.

BY Roylance, Abrams, Kruger,
Berdo & Kaul
ATTORNEYS.

Aug. 8, 1972   R. A. CLEARY ET AL   3,682,743
LABELLING MACHINE FOR PRESSURE SENSITIVE LABELS
Filed May 22, 1970   7 Sheets-Sheet 3

INVENTORS
ROBERT A. CLEARY
PAUL R. MORT, JR.

BY Roylance, Abrams, Kruger,
Berdo & Kaul
ATTORNEYS.

Aug. 8, 1972  R. A. CLEARY ET AL  3,682,743
LABELLING MACHINE FOR PRESSURE SENSITIVE LABELS
Filed May 22, 1970  7 Sheets-Sheet 4
FIG. 7
FIG. 8
FIG. 9
FIG. 10
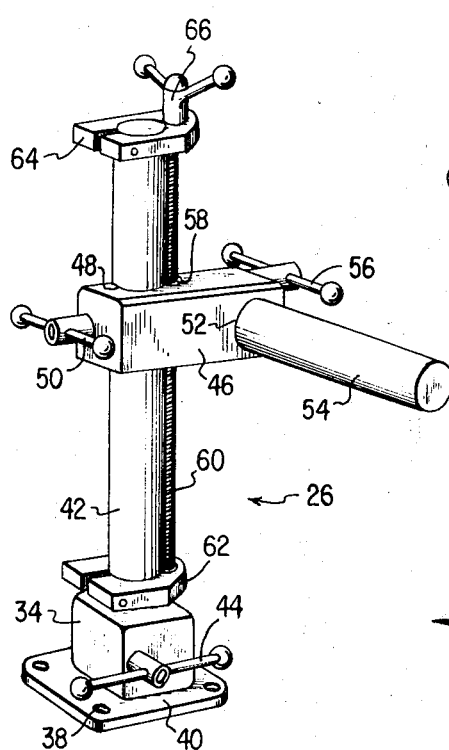
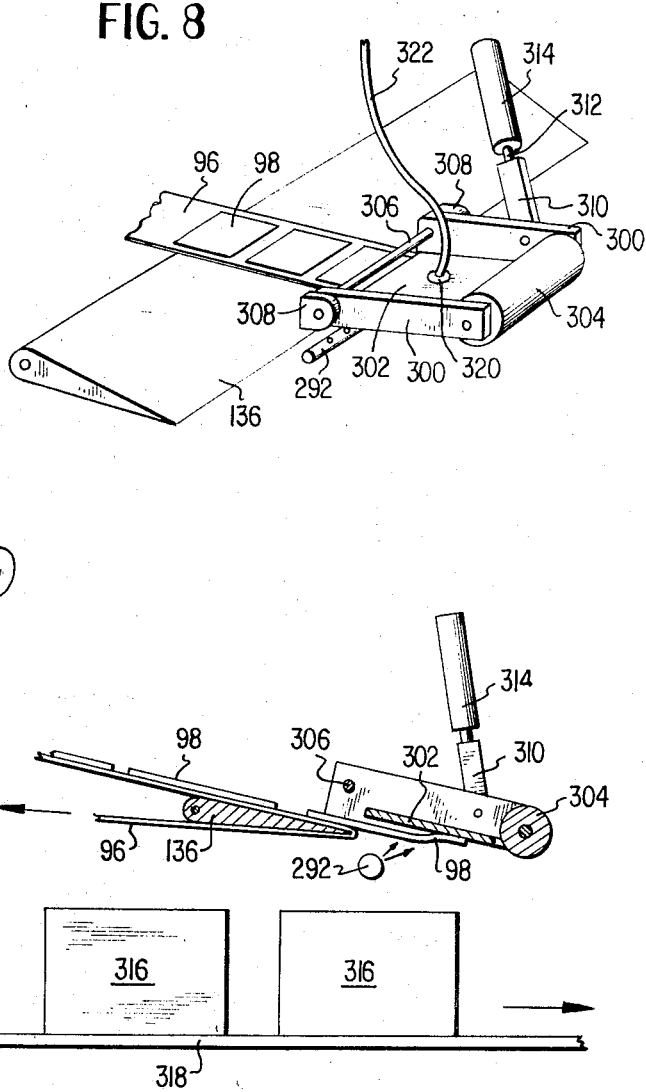
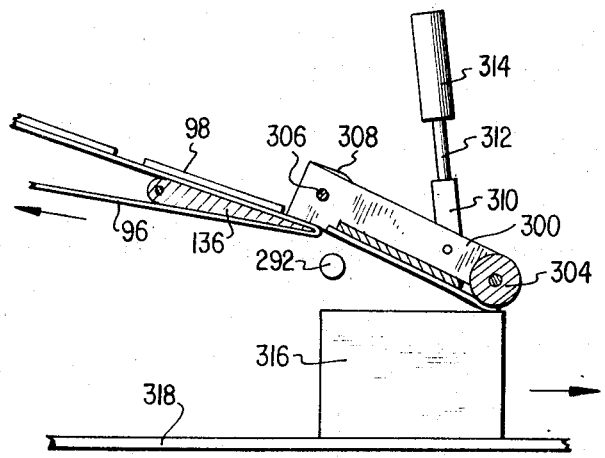
INVENTORS,
ROBERT A. CLEARY
PAUL R. MORT, JR.
BY *Roylance, Abrams, Kruger, Berdo & Kaul*
ATTORNEYS.

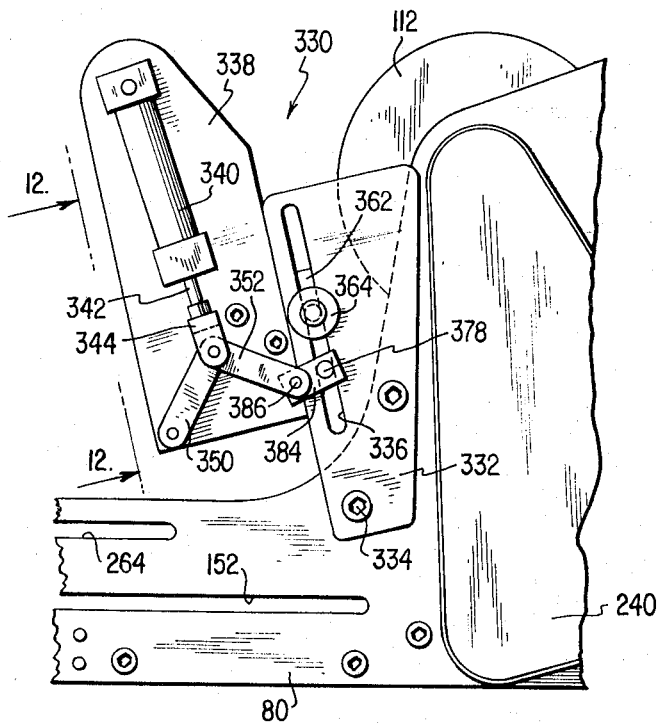

INVENTORS.
ROBERT A. CLEARY
PAUL R. MORT, JR.

BY Roylance, Abrams, Kruger,
Berdo & Kaul
ATTORNEYS.

INVENTORS.
ROBERT A. CLEARY
PAUL R. MORT, JR.

BY Roylance, Abrams, Kruger, Berdo & Kaul
ATTORNEYS.

United States Patent Office 3,682,743
Patented Aug. 8, 1972

---

3,682,743
LABELLING MACHINE FOR PRESSURE SENSITIVE LABELS
Robert A. Cleary and Paul R. Mort, Jr., Yonkers, N.Y., assignors to Syncro-Motion Corporation, Yonkers, N.Y.
Filed May 22, 1970, Ser. No. 39,708
Int. Cl. B32b 31/10, 31/20
U.S. Cl. 156—384   29 Claims

ABSTRACT OF THE DISCLOSURE

A machine feeds a backing strip with labels affixed thereto by pressure sensitive adhesive past a peeling blade. The labels are removed from the backing strip at the peeling blade and are supplied to an applicator which physically moves each label into contact with an object to be labelled. The backing strip then rewinds onto a take-up reel to form a closed loop with the forwardly feeding strip. If desired, a printing attachment can be supplied to imprint the labels prior to their arrival at the peeling blade.

---

This invention relates to a machine for feeding, dispensing and applying pressure sensitive labels, and more particularly, it relates to an improved form of labelling machine for handling pressure sensitive labels.

In the art of feeding and applying pressure sensitive labels, it has for some time been known that such labels can advantageously be mounted in spaced relation upon a backing strip or web which is fed by the machine toward a label applicator station. The web is then reversely folded over a peeling blade or other sharp edge so that the backing strip peels away from the label and the label itself is free to be received and subsequently applied onto an article.

In general, such labelling equipment has consisted of four basic elements which, combined together, are often utilized with a product or article handling machine such as a conveyor, feeder or the like. These four basic elements include (a) a labelling head, (b) a label applicator, (c) mounting means and (d) product sensors. The labelling heads themselves are used to receive the rolls of pressure sensitive labels mounted on the backing strip or web, to automatically feed the web forwardly and hence, on demand, to remove the label from the backing strip. The label applicators themselves receive or guide the individual label as dispensed from the labelling head and initially hold or guide the same in position by means of a vacuum or other holding or guiding means. Then, the label applicators can apply the individual label onto the article being fed therepast. Mountings are the stands or pedestals upon which the labelling heads and labelling applicators are applied, and the purpose of such mounting is not only to hold the parts in their respective positions, but also to enable the machine elements themselves to be placed properly adjacent the articles to be labeled. Finally, the product sensors are used to time the arrival of an article to be labelled so that the label will be properly applied at the right time.

It is an object of the present invention to provide a labelling machine for pressure sensitive labels which is an improvement over comparable machines heretofore known. In this regard, the labelling machine of the present invention provides a more efficient and compact machine, yet one which has a higher degree of versatility in use than was previously present in known machines of this general type.

Another object of the present invention is to provide an improved machine for feeding a web carrying a plurality of pressure sensitive labels, for individually removing such labels in properly timed sequence, and for automatically applying a removed label onto an article to be labeled.

Another object of the present invention is to provide a labelling machine for pressure sensitive labels, which machine is capable of accommodating labels of varying sizes and shapes, and which machine is capable of being manipulated to a variety of different positions to thereby enable the machine to be compatible with whatever type of article handling apparatus is used to feed the articles past the labelling machine.

Another object of the present invention is to provide a labelling machine which can be quickly and easily adjusted to any desired position and which can be quickly and easily assembled and disassembled for maintenance, repair, refilling, and so on.

Another object of the present invention is to provide a labelling machine which can be used in conjunction with a printing attachment so that the labels can be individually printed with coding or other data prior to applying such labels onto the articles or products to which they are to be ultimately attached.

Another object of the present invention is to provide a labelling machine having a unique and simple mounting means for the labelling head and other elements.

Other objects of the present invention include the provision of a labelling machine which is compact and efficient, yet is rugged and durable enough to withstand extended periods of operation without the need for maintenance or repair.

Other objects, advantages and salient features of the present invention will become apparent from the following detailed description, which, taken in conjunction with the annexed drawings, discloses a preferred embodiment thereof.

Referring now to the drawings which form a part of this original disclosure:

FIG. 7 is a perspective view of the mounting means used in the labelling machine;

FIG. 8 is a fragmentary perspective view of a modified applicator head;

FIGS. 9 and 10 are diagrammatic fragmentary section views showing operation of the modified applicator head;

FIG. 11 is a side elevational view showing a printing attachment for the labelling machine;

FIG. 12 is an elevational view taken along the line 12—12 of FIG. 11;

Figure 1:
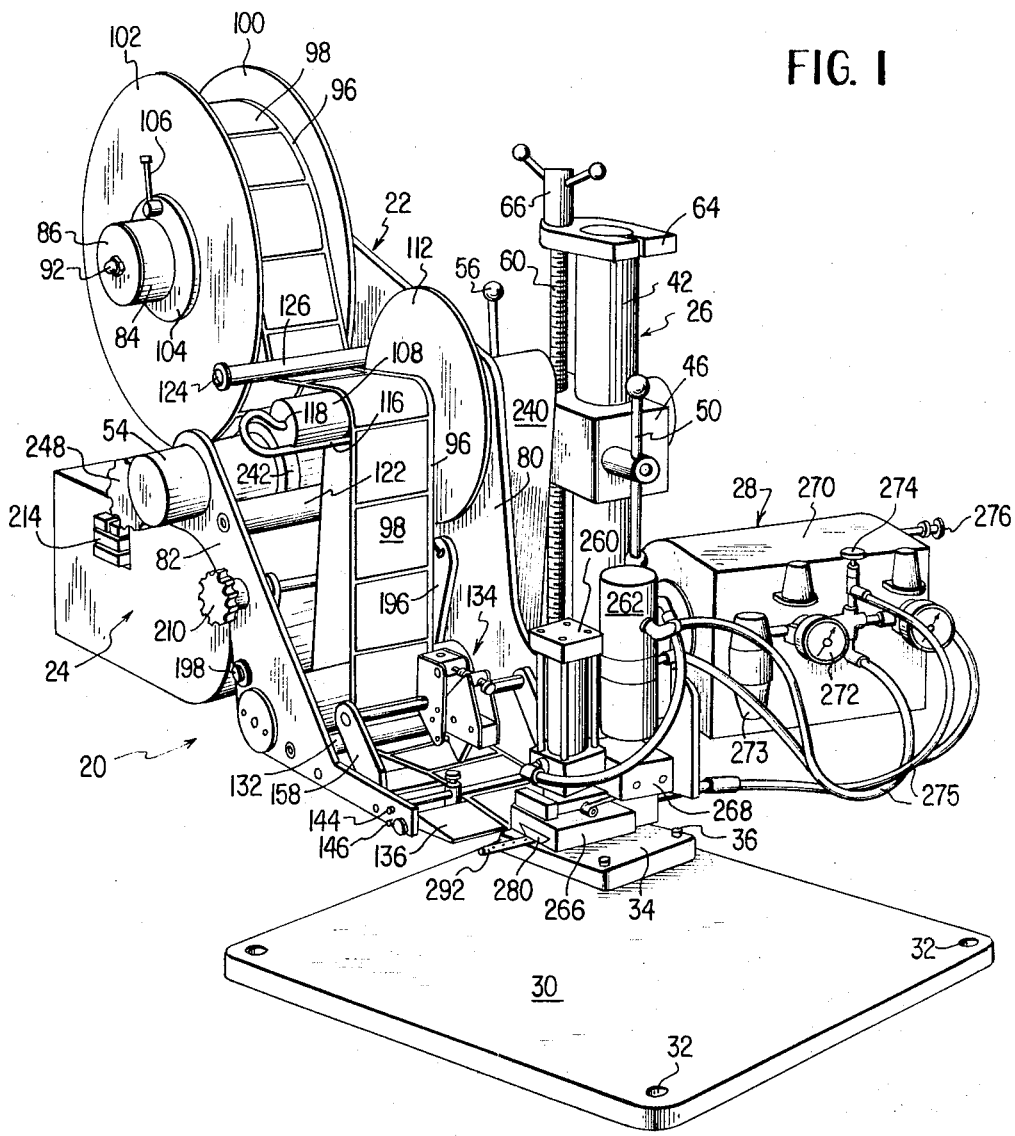
FIG. 1 is a perspective view of a labelling machine in accordance with the principles of the present invention.

Referring now to FIG. 1 for further details of the invention, there is illustrated in FIG. 1 a labelling machine in accordance with the principles of the present invention, such machine being generally designated 20. Such machine includes the labelling head generally designated 22 and having the drive package generally designated 24 mounted thereon, a mounting means generally designated 26 for mounting the labelling head 22 in position and a label applicator generally designated 28 for applying a dispensed label onto an article.

Considering first the mounting means 26, such means includes a flat base plate 30 having mounting holes 32 formed therein adjacent the corners thereof to enable the base plate to be attached to an affixed supporting surface. A first block housing 34, as can best be seen in FIG. 7, is attached to the base plate 30 by bolts 36 which pass through holes 38 in the bottom plate 40 of the mounting block 34. The mounting block 34 has a central bore or aperture formed therein into which an upright mount tube 42 is inserted. A rotatable clamping handle 44 is mounted on the block 34 for the purpose of clamping the lower end of the mount tube 44 within the block 34. The details of the block bore and the clamping handle 44 will be discussed in further detail hereinafter.

A dual mounting block 46 is provided adjacent one end with a through bore 48 through which the upright mount tube 42 extends. A clamping handle 50, similar to the clamping handle 44 is provided for clamping the mount tube 42 within the bore 48. The block 46 also carries a bore 52 disposed at an angle of 90° with respect to the bore 48 and into which is mounted a horizontal mount tube 54, similar or identical to the mount tube 42. Another clamping handle 56 is mounted adjacent the bore 52 to clamp the mount tube 54 therein.

As will be described shortly hereinafter, the entire labelling head 22 is supported upon the mount tube 54 in the preferred embodiment, as shown in FIG. 1. Accordingly, to enable a height adjustment of the label head 24, it is necessary to provide a means for vertically adjusting the mount tube 54 and the block 46 which carries the same. To accomplish such vertical adjustment, a threaded bore 58 is formed through the block 46, adjacent the through bore 48. A threaded rod 60 is engaged through the bore 58 and at its lower end is engaged in a split collar 62 attached to the mount tube 42 adjacent the lower mount block 34. A similar split collar 64 is mounted on the upper end of the mount tube 42 and the threaded rod passes through a bore therein and engages with an adjusting handle 66 projecting above the mount tube 42. Hence, when the clamping handle 50 is released so that the upright mount tube 42 can move freely through the bore 48, then rotation of the handle 66 will cause a corresponding rotation of the threaded rod 60 and will hence raise or lower the mount block 46, depending upon which direction the handle 66 is rotated. Once the mount block 46 and the mount tube 54 carried thereby have reached the desired elevation, then the clamping handle 50 can be tightened against the mount tube 42 to maintain the parts at their desired elevational position.

Figure 3:
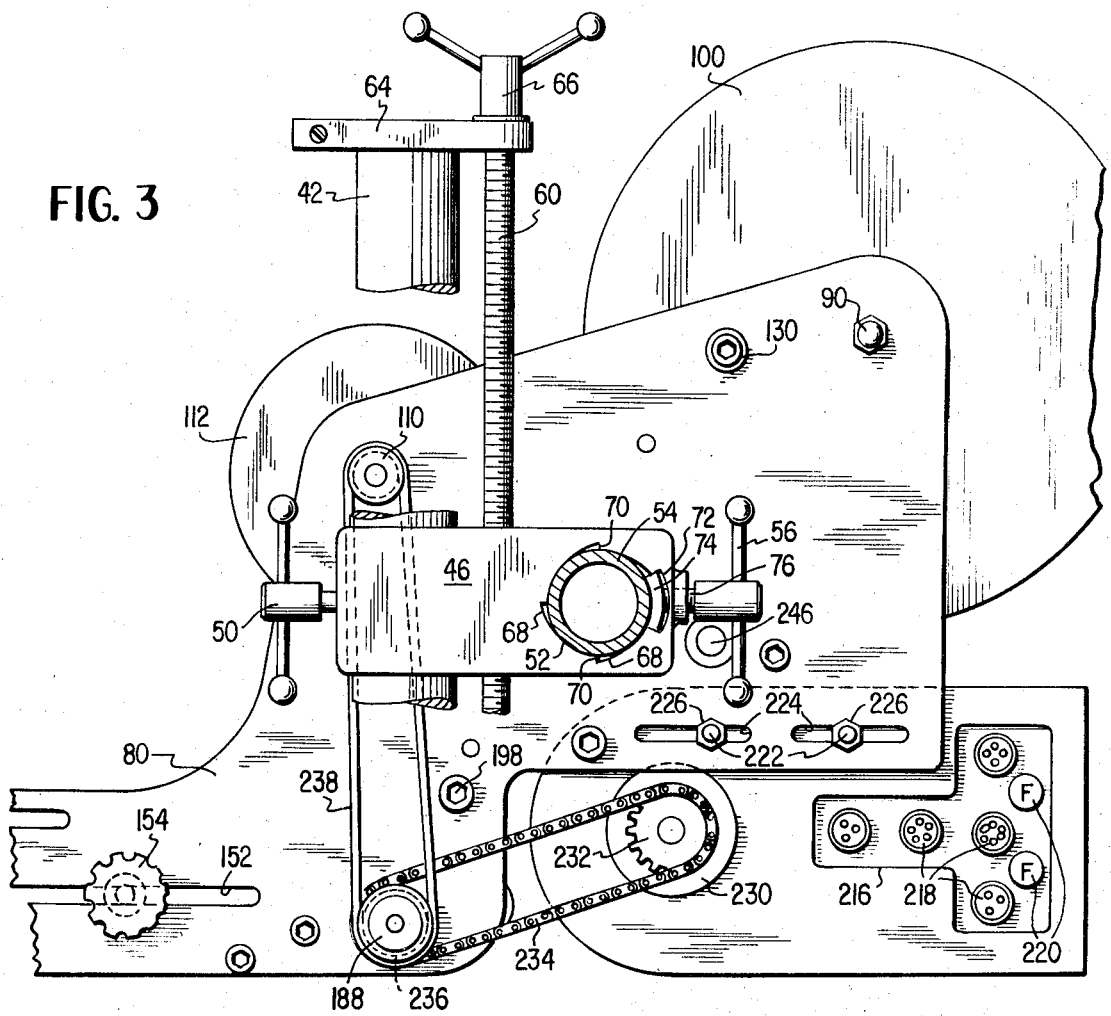
FIG. 3 is a fragmentary rear elevational view thereof, partly in section.

For details concerning the cross sectional configuration of the various mounting block bores, attention is directed to FIG. 3 wherein the details of the bore 52 are shown. As can be seen from FIG. 3, the bore 52 is formed as a series of interconnected involute sections 68 which thus form projections 70 where such involute sections intersect with one another. At that portion of the bore 52 which is directed toward the handle 56, an arcuate recess 72 is provided. Within such recess, there is mounted a shaped locking segment 74 whose inner surface, at least, is arcuately contoured to follow the exterior surface configuration of the mount tube 52. The segment 74 is mounted to the inner end of a threaded rod 76 whose outer end is attached to the clamping handle 56. As a result, when the clamping handle 56 is rotated in a direction to move the segment 74 inwardly, such segment will engage the mount tube 52 and will compress the same tightly against the walls of the bore 52. As a result of such compression which can be applied with sufficient force to temporarily deform the configuration of the mount tube 54, the projections 70 are locked tightly into the walls of the mount tube 54 and the tube is hence prevented from either rotating or moving axially. The cooperative relation thus described in FIG. 3 between the bore 52, mount tube 54 and clamping handle 56 is identical with the relationship between the bore 48, the tube 42 and the clamping handle 50 and is also identical with the relationship of the bore in the block 34 and the clamping handle 44 which act on the lower end of the mount tube 42. By using various combinations of mounting tubes, blocks and screws, it is possible to position the labelling head in any desired orientation, including upside down, or any plane angle.

Figure 2:
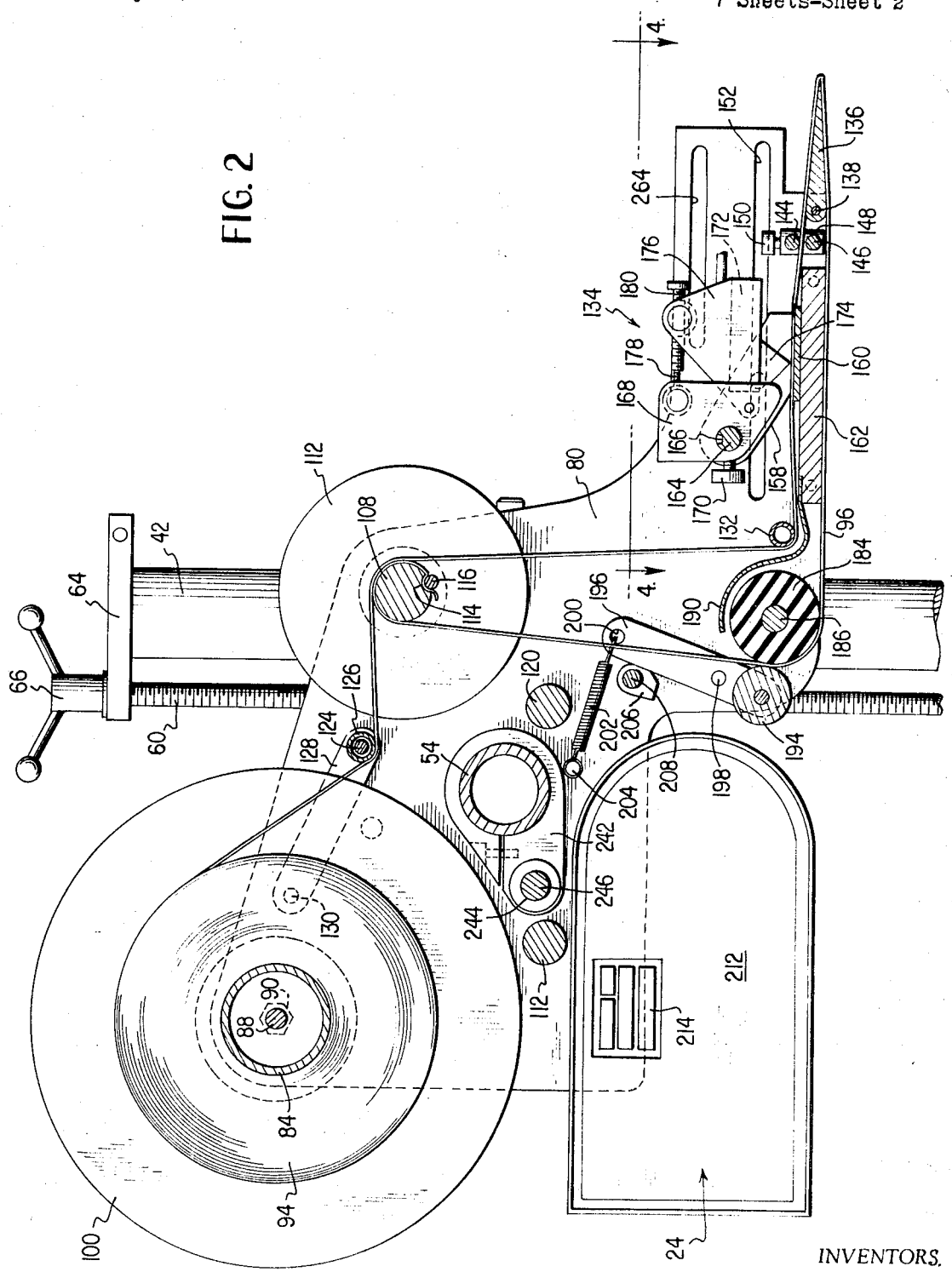
FIG. 2 is a longitudinal sectional view thereof.

Considering now the details of the labelling head 22, attention is directed to FIGS. 1–3 wherein it can be seen that a main frame plate 80 and a secondary frame plate 82 are disposed in spaced parallel relationship to one another. At the upper end of the main frame plate 80, there is mounted a hollow tube 84 which is held in position by means of an end cap 86, a through rod 88 and nuts 90, 92 which lock onto opposite ends of the through rod 88 and which hence keep the mounting tube 84 locked in position. This tube 84 serves as the mounting means for the supply reel of labels and backing strip. This supply reel 94 is formed by convolutely rolling a backing strip 96 having a series of labels attached thereto in closely spaced relationship. As is conventional, the backing strip 96 has some form of release coating on the surface while the labels 98 are provided wtih a pressure sensitive adhesive backing by which they are attached onto the backing strip 96. This supply reel 94 is mounted between a pair of guide discs 100, 102 which, as shown in FIG. 1, are also mounted on the tube 84 on opposite sides of the supply reel 94. These discs 100, 102 can be formed of plastic or some other substantially rigid material and the diameter of these discs should be at least as great, and preferably somewhat greater than that of the supply reel 94. The purpose of such discs is to make certain that the strip 96 will unwind off the reel 94 in a straight line fashion. At least the disc 102 is provided with a collar 104 and a releasable locking handle 106 for the collar, the purpose of which is to permit the spacing between the respective discs 100 and 102 to be varied to accommodate supply reels of varying width. The disc 102 is also easily removable to enable easy loading of a fresh roll of labels. The main frame plate 80 also carries a takeup bar 108, the rear end of which projects through the main frame plate 80 and terminates in a sprocket 110 as shown in FIG. 3. At least one guide disc 112 is carried by the take-up bar 108 adjacent the inner surface of the main frame plate 80. As can best be seen from FIG. 2, the take-up bar 108 is provided with an axially extending groove 114 the purpose of which is to receive a clamp bar 116 whose end 118 is engaged in the outer end of the take-up bar 108. The purpose for such clamp bar is to grip the free end of the backing strip against the take-up bar, as shown in FIG. 2, so that when the take-up bar 108 is rotated, the backing strip will be wound thereonto as the take-up reel.

A pair of fixed bars or rods 120, 122, best seen from FIG. 2, extend rigidly between the main frame plate 80 and the other frame plate 82 and thus serve to rigidly mount and maintain such frame plates in their spaced parallel relationship to one another.

Between the bar 84 for the supply reel and the take-up bar 108, there is mounted an idler rod 124 having a freely rotatable cylinder 126 attached thereto. The inner end of the idler rod 24 is attached to a pivot arm 128 whose opposite end is pivotally mounted at 130 to the main frame plate 80. As can be seen from FIGS. 1 and 2, when the backing strip 96 with the labels 98 thereon unwinds forwardly off the supply reel 94, it passes under the idler rod 124 and its surface cylinder 126, then passes across the take-up reel or bar 108, then feeds substantially straight downwardly and passes around another idler roll or bar 132. Since, as previously indicated, the backing strip 96 rewinds onto the take-up reel 108, it will thus be seen that the supply web formed by the strip 96 with the labels 98 thereon actually passes over, and is in direct contact with, the outer surface of rewound web, formed by the backing strip 96. The effect of this contact between the feeding supply web and the rewinding web is to minimize the shock action from the inertial resistance of the supply reel 94 as the supply web with the labels 98 unwinds intermittently therefrom. This results in more uniform tension and less jerk on the supply web, since rewinding of the backing strip actually assists in the forward feeding of the supply web.

The strip with the labels thereon then feeds forwardly beneath a label sensor generally designated 134 and across the upper surface of a peeling blade 136 mounted pivotally by means of a bar 138 which extends between the frame plates 80, 82. At least one end of the bar 138 is provided wtih a locking nut 140, the purpose of which is to lock the peeling blade 136 in any desired position. However, when the locking nut 140 is loosened, the peeling blade 136 can be pivoted to move its leading edge 142 to any desired angular position. A double pair of guide bars 144, 146 extend between the frame members 80 and 82 at a position between the label sensor 134 and the peeling blade 136. The web with the labels thereon feeds between the upper guide bar 144 and the lower guide bar 146 and a pair of lateral guide members 148 are positioned on these guide bars and are adjustable, by loosening adjustment screws 150 to enable such guide members 148 to be moved laterally to any desired position. It will, accordingly, be understood that the guide members 148 guide the edges of the web or backing strip 148 at the forward end of the labelling head just as the disc members 100, 102 guide the same at the rear end of the labelling head.

Figure 4:
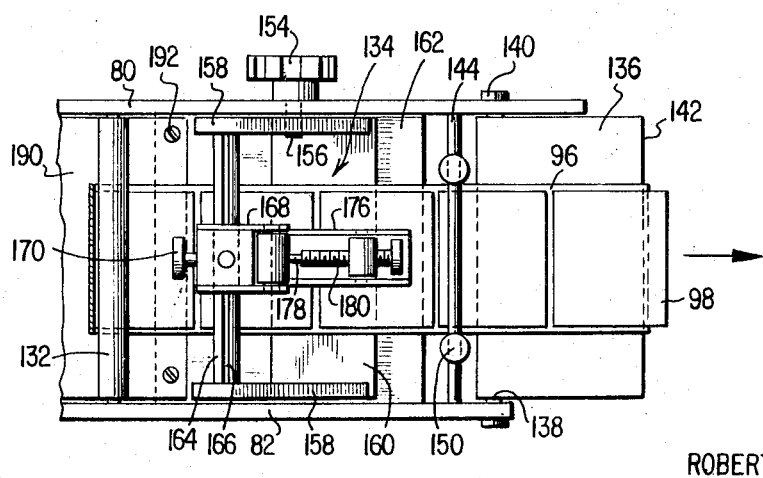
FIG. 4 is a fragmentary top plan view thereof taken along the line 4—4 of FIG. 2.

Referring now to FIGS. 2 and 4 for the details of the label sensor 134, it should first be noted that an elongated slot 152 is formed at the forward end of the main frame plate 80. The purpose for this slot 152 is to enable the entire label sensor 134 to be slid forwardly or rearwardly until it is disposed at its desired sensing position. To enable such adjustment to take place a knob 154 is provided with an inwardly extending threaded rod 156 which passes through the slot 152 and threads into one of the side brackets 158 of the label sensor. As a result, when the knob 154 is loosened, the label sensor can be slid forwardly and rearwardly through the slot 152. However, when the knob 154 is tightened to pull the bracket 158 into engagement with the inner surface of the main frame plate 80, then the label sensor 134 is locked in position. The label sensor 134 is provided with two side brackets 158 which are spaced part in parallel relationship by substantially the distance between the frame members 80 and 82. These bracket members 158 are supported upon and attached to a lower platform 160 which, in turn, is seated upon a platform 162 which is fixed between the frame members 80 and 82. A bar 164 having a groove 166 extending the length thereof is connected between the upper ends of the side brackets 158 and a housing 168 is slidably mounted on the bar 164. An adjustment screw 170 is used to lock the housing in any desired lateral position along the bar 164. A microswitch 172 actuated by means of a pointed sensing toe 174 is carried in a housing 176 which is pivotally attached to the housing 168. A double adjustment screw arrangement formed by screws 178, 180 is provided for adjusting the pivotal position of the microswitch housing 176 relative to the position of the housing 168. This double screw arrangement provides a vernier adjustment which enables the precise elevation of the sensing toe 174 above the platform 160 to be accurately adjusted.

As best shown in FIG. 2, the web or backing strip 96 with the labels 98 thereon feeds around the idler 132 and across the platform 160, hence passing beneath the sensing toe 174. The entire purpose of the sensing toe is to enable the machine to sense or time the position of the labels. More specifically, when a label is present, the sensing toe will be pushed upwardly to thus activate the microswitch 172. When, however, the gap between adjacent labels passes beneath the sensing toe, then the toe will descend into contact with the backing strip 96 and will hence deactivate the microswitch 172. Since the purpose of the sensing toe is thus to sense the thickness or height of a label 98, it is apparent that there must be an extremely fine adjustment to be certain that the toe can be moved to the precise desired elevation. Such adjustment, as aforesaid, is accomplished by the vernier adjustment screws 178, 180. For the purpose of simplifying the operation of initially threading the web through the labelling head 22, the entire label sensing mechanism 134 can be swung upwardly by rotating the housing 166 about the bar 164, thus lifting the entire toe 174 clear of the platform 160.

As is conventional in labelling machines of this type, when the backing strip 96 is peeled over the sharp leading edge 142 of the peeling blade 136, the label 98 is peeled away from the backing strip. This is at least partially illustrated in FIG. 4 of the drawings. The backing strip itself then feeds rearwardly beneath the bottom surface of the peeling blade 136, beneath the bottom surface of the platform 162 and around a drive roll 184, preferably formed of rubber or other similar exterior material and having a rigid central bar 186 which projects through the main frame plate 80 and terminates in a sprocket 188. The web or backing strip 96 then feeds upwardly and wraps around the take-up bar 108, as best illustrated in FIG. 2. A metal cover 190 extends over the front and top of the drive roll 184 and is attached by screws 192 to the rear end of the platform 162. In order to enhance the driving action of the drive roll 184 upon the backing strip 96 being wound into a take-up roll, a knurled idler 194 is positioned to the rear of the drive roll 184 to provide a nip through which the backing strip passes as it rewinds onto the take-up roll 108. The idler roll 194 is carried on the lower end of a lever 196, such lever being pivotally mounted at 198 to both frame plates 80 and 82. The upper end of the lever 196 is provided with an aperture 200 for receiving one end of a tension spring 202. The opposite end of the tension spring 202 is fixed to a pin or projection 204 projecting inwardly from the frame plates. If two tension springs 202 are used, as is preferred, then one pin 204 will project inwardly from the frame plate 82. In order to accomplish swinging action of the lever 196, when it is desired to open the nip by moving the rolls 184 and 194 apart to thereby facilitate threading of the lead end of the backing strip 96, cams 206 are provided, one adjacent each lever 196, as shown in FIG. 2. These cams 206 are mounted on a rod 208 which projects through the frame plate 82 and terminates in a control knob 210. When the control knob 210 is rotated to thus rotate the rod 208, the cams 216 engage the lever 196 and push the upper end thereof forwardly, thus pivoting the lever about its pivot point 198 and moving the knurled roller 194 away from the drive roll 184. In this position, the lead end of the backing strip 96 can be fed through the nip and attached to the take-up roll 108. Then, the knob 210 can be rotated to release the cam action so that the springs 202 can bias the levers 196 to cause the knurled roll 194 to engage the backing strip 96 tightly against the drive roll 184.

Considering now the details of the drive package 24, it will be seen that such package is mounted within a housing or casing 212. A series of control buttons 214 project through that surface of the casing 212 aligned with the frame plate 82, to thereby enable an operator to quickly and easily control the feeding action of the web and the labels thereon. The rear surface of the housing, as shown in FIG. 3, has a recess 216 formed therein to expose a plurality of plugs 218 and fuses 220. Suitable electrical leads can be connected with the plugs 218 to provide power for the drive package 24. A pair of studs 222 project rearwardly from the drive package and through slots 224 in the main frame plate 80, and by the use of two nuts 226, the entire drive package can be supported onto such frame plate. As a result, it can be seen that the entire drive package 24 is connected with the remainder of the label heads simply by the studs 222 and the nuts 226 and hence if something goes wrong with the drive package, the entire package can be quickly and easily removed and a new package substituted in its place. As an alternative mounting arrangement, threaded holes can be provided in the drive package and bolts can be used in lieu of the studs 222 and nuts 226. Within the package, a drive motor 230 is provided to drive a sprocket 232. A chain drive 234 connects the sprocket 232 with another sprocket 236 mounted on the shaft 186 of the drive roll 184. A slip type belt drive 238 connects the sprocket 188 of the drive roll with the sprocket 110 of the take-up roll, as best shown in FIG. 3. As a result, when the appropriate button 214 is pushed to operate the drive motor 230, the chain drive 234 will cause a rotation of the drive roll 184 and hence the sprocket 188 attached thereto. This sprocket or pulley in turn will cause the slip drive 238 to rotate the take-up reel 108, but if some difference in speed between the rolls 184 and 108 is required, as is the case when the diameter of the take-up reel increases, then this speed difference is accomplished by a slipping action of the belt 238 on its respective sprockets or pulleys 110 and 188. A cover 240 can be releasably attached over the entire drive belt and drive chain arrangement, as partially shown in FIG. 1, so that such driving arrangement will not be exposed during operation.

To accomplish any desired transverse adjustment of the label head 22, a split collar 242 is attached to the transverse mount tube 54. Such split collar includes a threaded aperture 244 through which a threaded rod 246 passes. The threaded rod 246, in turn, projects through the mount plate 82 and attaches with a knob 248, as shown in FIG. 1. Thus, when the knob 248 is rotated to cause a concurrent rotation of the threaded rod 46, the mount tube 54 and its attached split collar 242 will remain stationary while the entire label head 22 traverses with respect thereto.

The foregoing detailed description has been directed to the manner of operation of the label head, the manner in which the same can be mounted and adjusted vertically and horizontally, and the manner in which the labels 98 are dispensed individually from their backing strip 96. Now, attention can be directed to the manner in which such labels are received and applied to an article or product which is to be labeled. A pneumatic cylinder arrangement 260 and a valve 262 for operation thereof are suitably attached to the main frame plate 80, such attachment occurring by means of fitting the same through a slot 264 in the forward end thereof. The cylinder is provided with a movable cylinder head 266, which, in its upper position, contacts a microswitch 268. The details of the cylinder head will be described shortly hereinafter. The applicator 28 also includes a pump means 270 mounted within a housing which also attaches to the main frame plate 80 but on the other side thereof. The standard regulator gauges 272, filter 273, control knob 274, flow lines 275 are provided for air pressure control. Another control knob 276 is provided for vacuum control.

Figure 5:
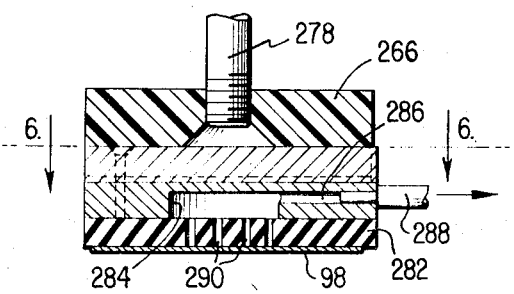
FIG. 5 is a fragmentary sectional view of the applicator head.
Figure 6:
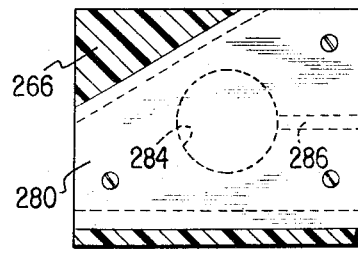
FIG. 6 is a sectional view taken along the line 6—6 of FIG. 5.

Referring now to FIGS. 5 and 6, it can be seen that the cylinder head 266 is threadably attached to the lower end of the piston rod 278 which is moved when the piston, not shown, is energized within the cylinder 260. A five sided plate member 280, whose configuration can best be seen from FIG. 6, is slidably mounted within the cylinder head 266. Because of the inverted or converging groove arrangement between the plate 280 and the head 266, the plate can easily be slid laterally into engagement with the head. A resilient pressure pad 282, fabricated of rubber or other similar material, is attached to the underside of the pad 280 by any suitable attachment means. The pad 280 is provided with an internal vacuum chamber 284 connected via a lateral bore 286 with a vacuum hose 288. The resilient or pressure pad 282 has a series of small holes 290 therethrough so that the vacuum which is drawn within the chamber 284 will pass through the holes 290 and thus be effective to hold a label 98 in position beneath the pressure pad 282, with the adhesive side of the label facing downwardly for application onto an article. If desired, a blow pipe 292 can be positioned adjacent the cylinder head to blow air upwardly for the purpose of assuring that a label 98 remains affixed by pressure forces, not by adhesive forces, to the pressure pad 282.

Obviously, in operation, when the label sensor 134 and the label applicator cylinder 260 are working in timed conjunction, to be determined by the forward feeding speed of the article to be labeled, a label which is peeled off the backing strip 96 as such strip passes around the forward edge 142 of the peeling blade will be grasped and held by vacuum on the pressure pad 282, in the manner shown in FIG. 5. Since the label will reach this vacuum held position when the cylinder head 266 is in the uppermost position, such cylinder head will be actuating the microswitch 268. Then, in appropriately timed sequence, the valve means 262 will actuate the cylinder 260 to move the cylinder head 266 and hence the label and the pressure pad downwardly into engagement with an object to be labelled, which object may be carried by a conveyor or fed intermittently by an index table or other device. As the label is pressed onto the object, the adhesive force from the pressure sensitive adhesive on the underside of the label will cause the label to adhere to the article and be stripped off of the pressure pad 282. Thereupon, the cylinder head will move back upwardly until it again engages the microswitch 268 and at that point or shortly thereafter, another label will be dispensed and peeled away from the backing strip to be held by vacuum forces on the pressure pad 282.

The applicator just described finds particular utility in the arrangement where the articles to be labelled are being fed intermittently. However, in the event that the articles to be labelled are being fed continuously, it might be advantageous to use a different type of applicator, and in this regard, attention is directed to FIGS. 8–10. In FIG. 8, the backing strip 96 with the labels 98 thereon is shown feeding across the peeling blade 136. Attached to or adjacent to the forward end of the blade 136 is a guide formed by a pair of spaced arms 300 connected at their undersides by a plate 302. An applicator roller 304 is rotatably mounted between the arms 300 at their forward ends. At their rearward ends, the arms 300 are attached by a pivot pin 306 to mounting blocks 308. A link 310 pivotally connects one of the arms 300 to the outer end of a piston rod 312 movably mounted within an air cylinder 314. The blow tube 292 is positioned in advance of the leading edge of the peeling blade 136 and beneath the plate 302 so that the air issuing from the tube blows the label upwardly toward the plate 302.

The articles 316 to be labelled are, for example, disposed in spaced relation along a continuously moving conveyor belt 318. As the web 96 unwinds across the end of the peeling blade 136, the label continues moving forwardly and hence passes beneath the guide plate 302 and approaches the roller 304. The air issuing from spaced parts in the tube 292 supports the forward end of the label and directs it toward the plate 302. At an appropriate time in the sequence, when the lead end of the label 98 has reached the roller 304, the cylinder 314 is actuated to project the rod 312 outwardly. Such actuation causes the arms 300, plate 302 and roller 304 to swing downwardly. This downward swinging motion causes the leading edge of the label 98 to be applied to the forward end of the article 316, with such label leading edge being held between the roller 304 and the top surface of the article 316. As the conveyor 318 continues to feed the article 316 forwardly, the label 98 is applied by the roller 304 to the top of the article. At the appropriate time sequence, which can be adjusted to any desired time, the cylinder 314 retracts the rod 312 and lifts the applicator mechanism so that a new label 98 can feed into position for the next product 316.

While the applicator arrangement just described operates quite satisfactorily, particularly in view of its simplicity, it must be recognized that the degree of accuracy of label placement might be limited in view of the fact that the forward feed of the label is dependent upon adhesive attachment to, and forward feeding of, the supply web. Hence, to provide a greater degree of accuracy, a vacuum port 320 can be formed in the guide plate 302, such port being connected with a vacuum hose 322, as shown in FIG. 8. By drawing a vacuum through this port while the applicator is in raised position, the label can be held on the underside of the guide plate 302 prior to its application onto the article 316. With such an arrangement, the label can be fed entirely off of the web prior to application.

If attention is now directed to FIGS. 11–15, a printing head attachment generally designated 330 will be described. A plate 332 is attached by bolts 334 to the outside or rear surface of the main frame plate 80. The plate 332 is provided with an elongated slot 336, which, in a manner to be described, enables the printing attachment to be adjusted in height. Another plate 338 is disposed forwardly of the plate 332, with the plate 338 serving as a support for an air cylinder 340. The air cylinder has a downwardly extending piston rod 342 which threadably connects with a clevis 344. An adjustment nut 346 enables the clevis to be adjusted on the piston rod to accomplish variation of the printing pressure. A pivot pin 348 extending through the clevis 344 acts as the pivot connection for the inner ends of a pair of links 350 and 352. The opposite end of the link 350 is pivotally attached to the plate 338.

Referring to FIG. 12, it will be seen that a base plate 354 with an ink pad 356 on the upper surface thereof is attached by bolts 358 to a pair of side plates 360, 362. The side plate 362 has a stub shaft projecting through the slot 336 and connecting with an adjusting knob 364, as shown in FIG. 11. By loosening the knob 364, the side plate 362 and all structure connected therewith can be moved up or down for adjustment purposes. A fixed pin 366 projects inwardly from the plate 362 and passes through a slot 368 in the side leg 370 of an L-shaped shuttle member. The bottom or base leg 372 of the shuttle member serves to support the type plate 374 which is attached to the base leg 372 by wing nuts 376. A pivot rod 378 is journaled in the side plates 360, 362, and between such side plates, the rod carries a pair of fixed links 380, 380 each of which carries an inwardly directed pivot pin 382. Bores are provided at opposite sides of the base leg 372 to enable the pivot pins 382 to project into and hence pivotally support the shuttle member. One end of the pivot rod 378 projects through the slot 336 and fixedly attaches to one end of a link 384. The other end of the link 384 is pivotally attached at 386 to the end of the link 352. Finally it can be seen that a striker plate 388 is affixed to the inside of the plate 332 and projects inwardly therefrom at an angle of approximately ninety degrees to the ink pad 356.

Figure 13:
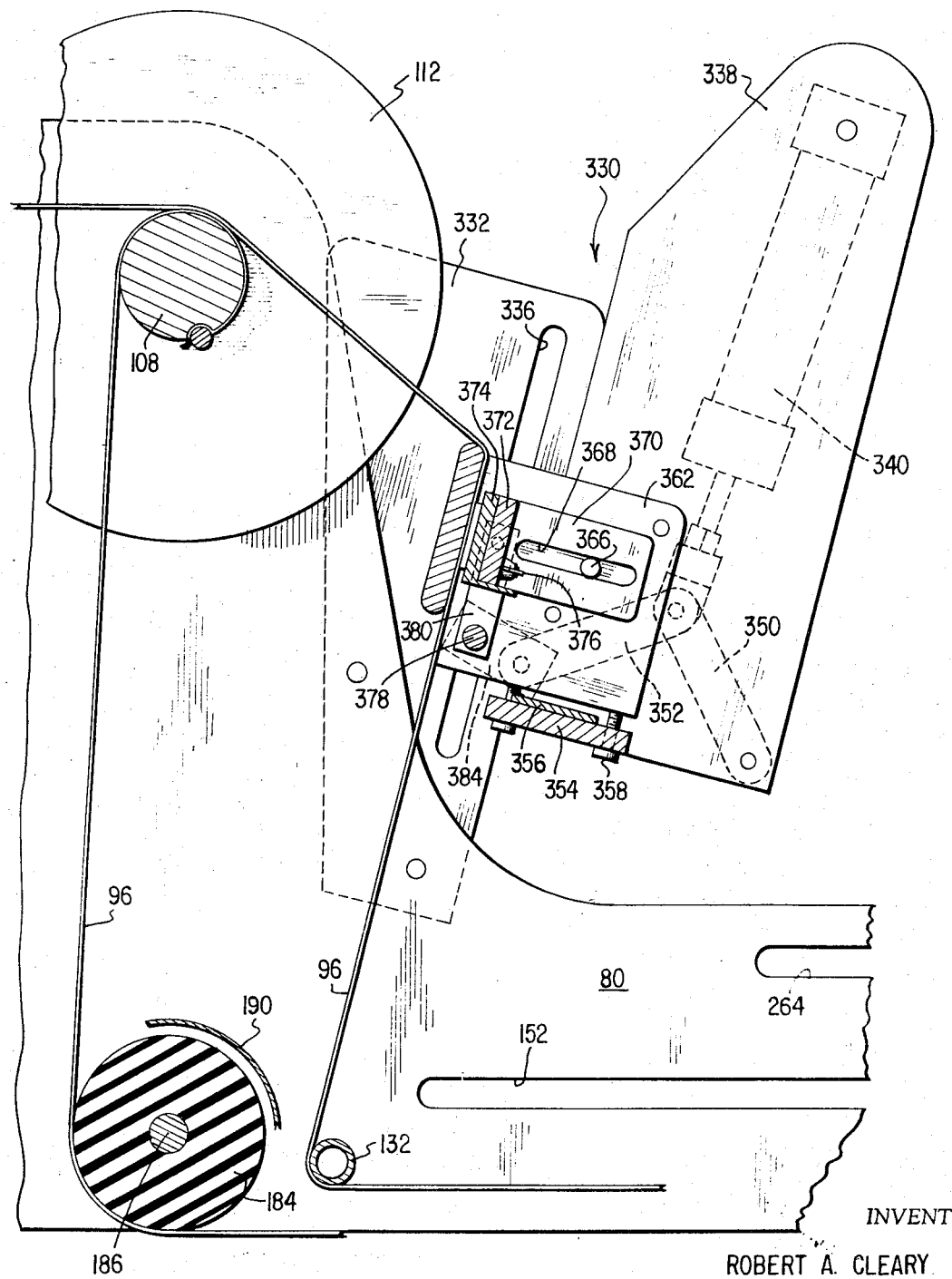
FIG. 13 is an elevational view taken along the line 13—13 of FIG. 12.
Figure 14:
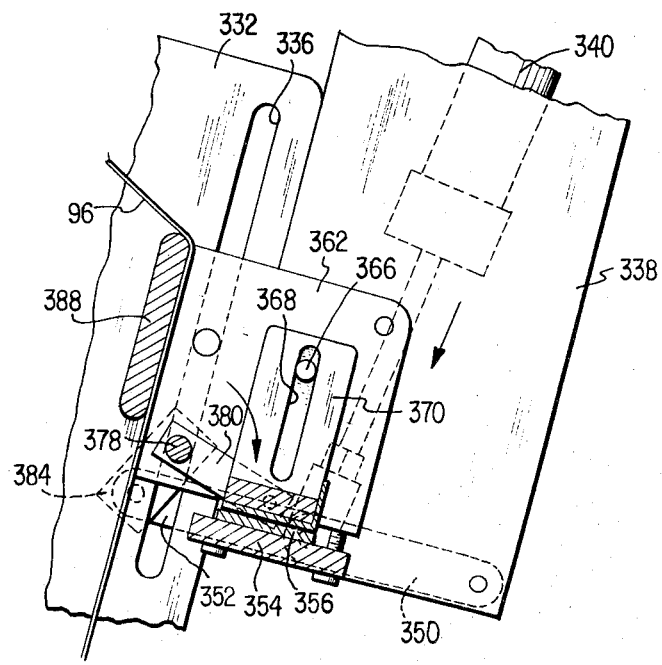
FIGS. 14 and 15 are fragmentary sectional views similar to FIG. 13 showing operation of the printing attachment.
Figure 15:
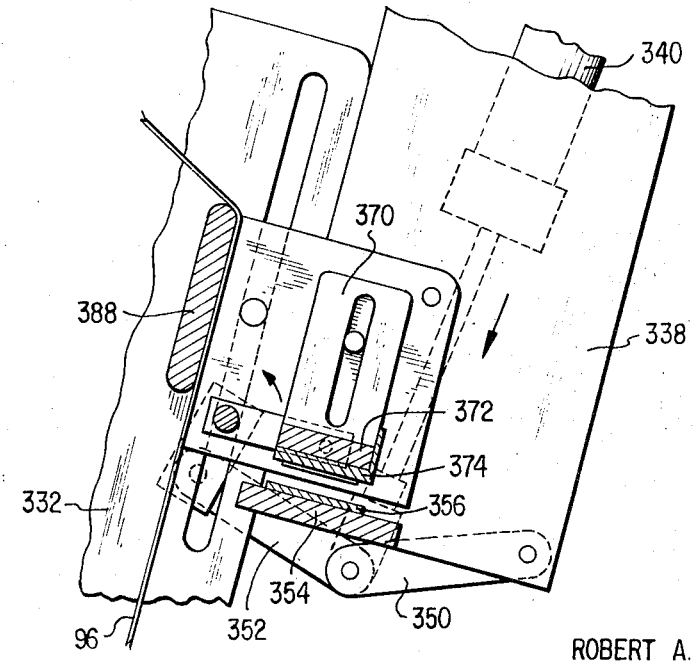

As is apparent from FIGS. 13–15 the web 96 with the labels 98 thereon feeds over the take-up roll 108 and across the striker plate 388, on its way to the peeling blade. The entire purpose for the printing attachment 330 is to enable the labels 98 to be printed with whatever legend is carried by the type plate 374. Operation of the air cylinder 340 causes the shuttle member to bring the type plate 374 into contact with the ink pad 356, then to swing through an arc of ninety degrees to press a label 98 and the backing strip 96 against the striker plate 388 for the purpose of stamp printing the label.

More specifically, when the air cylinder 340 fully extends the piston rod 342 to the position shown in FIG. 15, it will be seen that the links 350, 352 have moved past their dead center position of FIG. 14 and the type plate 374 is held slightly above the ink pad 356. When a printing operation commences, the piston and the piston rod 342 retract with the air cylinder 340 and eventually the clevis 344 pulls the links 350, 352 into the aligned or dead center position of FIG. 14. In such position, the shuttle member is moved downwardly to force the type plate 374 into contact with the ink pad 356. As the piston rod continues to retract, the shuttle member is swung through a ninety degree arc until it reaches the printing position of FIG. 13. At such position, the piston rod is fully retracted.

To complete the stroke, the piston rod is again extended, and the links pass through the dead center position of FIG. 14 and end up in the position of FIG. 15. It will thus be seen that during each complete stroke of the cylinder 340, i.e. during one total retraction and extension of the piston rod 342, the links 350, 352 pass through their dead center positions twice and the type plate 374 thus hits the ink pad 356 twice. As aforementioned, the vertical position of the printing attachment shuttle member can be adjusted via the knob 364 so that the type plate 374 will strike at the striker plate 388 at exactly the proper elevation. The printing pressure, which is the pressure with which the type strikes against a label, can be adjusted, as aforementioned, by adjustment of the clevis 344 and its adjustment nut 346. The pressure of the type against the ink pad 356 can be adjusted by the screws 358 which can move the base plate 354 which carries the ink pad closer to or further away from the side plates 360, 362.

After reading the foregoing detailed description, it should be apparent that the objects set forth at the outset of the specification have been successfully achieved by the present invention. However, since the foregoing detailed description represents only the currently preferred embodiment of the present invention, various modifications and alterations apparent to those skilled in the art may be made without departing from the spirit and scope of the invention as defined in the appended claims.

What is claimed is:

1. A machine for dispensing and applying pressure sensitive labels from an elongated web to which said labels are originally attached, said machine comprising:
   a main frame means;
   support means for positioning said main frame means;
   a supply reel upon which said labels and elongated web can be mounted in convolutely wound form;
   a take-up reel upon which said elongated web can be rewound after the labels have been removed therefrom;
   a peeling blade across which said web can feed, said peeling blade having a forward edge which causes a label to peel away from said web as said web is pulled across said forward edge;
   web guiding means for directing the path of travel of said web from said supply reel across and in contact with the rewound web on said take-up reel, then across said peeling blade, and finally back to said take-up reel to rewind thereon;
   drive means for moving said web through said web guiding means; and
   label sensing means mounted on said machine in advance of said peeling blade to sense the spacing of labels on said web.

2. A machine as defined in claim 1 wherein said drive means includes:
   a driven roller located between said peeling blade and said take-up reel,
   a drive package including a drive housing, a drive motor and drive controls; and
   driving means connected between said drive motor and said driven roller.

3. A machine as defined in claim 2 wherein said drive package is releasably connected to said main frame means.

4. A machine as defined in claim 2 wherein said drive means further includes an additional driving means connected between said driven roller and said take-up reel.

5. A machine as defined in claim 1 wherein said support means includes:
 first and second axially elongated mount tubes disposed substantially perpendicularly to one another;
 said first mount tube projecting through said main frame means to support said main frame means;
 said second mount tube being attachable to a support surface.

6. A machine as defined in claim 5 wherein said support means further includes:
 a block having a pair of bores therein offset from each other by ninety degrees;
 a movable clamp segment forming a portion of the wall of each of said bores;
 a clamp operating handle connected to each movable clamp segment to move said clamp segment into and out of said bore;
 said first mount tube being disposed in one of said bores and said second mount tube being disposed in the other of said bores;
 said clamp operating handles being operable to cause said clamp segments to clamp said mount tubes within said bores.

7. A machine as defined in claim 6 further including a threaded adjustment rod disposed parallel to each of said mount tubes, one of said adjustment rods serving to adjust the position of said block axially along said second tube, the other of said adjustment rods serving to adjust the position of said main frame means axially along said first tube.

8. A machine as defined in claim 1 further including a label applicator means disposed forwardly of said peeling blade for receiving a label peeled away from said web and for physically moving said label into contact with an object to be labelled.

9. A machine as defined in claim 8 wherein said label applicator means includes:
 a cylinder and piston arrangement including a piston rod projecting beyond said cylinder;
 a pad attached to said piston rod;
 means for temporarily attaching a label peeled away from said web by said peeling blade onto said pad; and
 fluid circuit means for said cylinder and piston arrangement to cause said piston to move said piston rod and hence the pad and label to a position where said label can contact the object to be labelled and can transfer from said pad onto said object.

10. A machine as defined in claim 9 wherein said means for temporarily attaching a label onto said pad includes a vacuum means connected with said pad and at least one aperture in said pad to permit the vacuum to hold said label against said pad.

11. A machine as defined in claim 8 wherein said label applicator means includes:
 a plate member having a roller mounted at the end thereof furthest from said peeling blade;
 pivot mounting means connected with said plate member at the end thereof nearest said peeling blade;
 power means connected with said plate member for swinging said plate member about its pivot mounting means;
 means causing a label being peeled away from said web by said peeling blade to traverse beneath said plate member toward said roller, with the adhesive surface of said label being directed away from said plate member;
 said power means being operative to swing said plate member substantially when said lead end of said label reaches said roller, said swinging continuing until said label lead end contacts the object to be labelled whereupon continued motion of said object will cause said label to pass beneath said roller which will aid in applying said label to said object.

12. A machine as defined in claim 11 wherein said label applicator means includes a gas pressure means directed toward the underside of said plate member to form at least a part of said means causing said label to traverse beneath said plate member.

13. A machine as defined in claim 11 further including aperture means in said plate member and a vacuum source connected with said aperture means to facilitate holding said label against said plate member during swinging movement thereof.

14. A machine as defined in claim 1 further including a printing attachment for imprinting said labels while they remain attached to said web, said printing attachment including:
 a striker bar located between said take-up reel and said peeling blade so that said web passes across said striker bar on its way to said peeling blade;
 an ink pad and ink pad support disposed at an angle of substantially ninety degrees to said striker bar and spaced from said striker bar a sufficient distance so that said web with said labels thereon can pass between said striker bar and said ink pad support;
 a movable type carrying shuttle member;
 shuttle member operating means for causing said shuttle member to contact the type against said ink pad, then to swing through an angle of substantially ninety degrees to contact a selected label and to press the web behind said selected member against said striker bar, thereby imprinting said selected member.

15. A machine as defined in claim 14 wherein said shuttle member operating means includes:
 a fluid operated cylinder and piston arrangement, including an elongated piston rod; and
 a toggle mechanism operatively connecting said piston rod to said shuttle member.

16. A machine as defined in claim 15 wherein said shuttle member includes a base member upon which the type can be carried and a leg portion having a slot therein and wherein a fixed pin is provided to project through the slot in said leg portion.

17. A machine as defined in claim 16 wherein said shuttle member operating means further includes:
 a rotatably mounted rod disposed forwardly of said striker bar and above said ink pad support;
 said rod being operatively connected with said toggle mechanism so that movement of said piston rod causes corresponding rotation of said rod;
 a pair of spaced links fixed to and rotatable with said rod;
 said links extending along opposite sides of said shuttle member; and
 pins projecting inwardly from each of said links to engage within bores in said shuttle member.

18. A labelling machine for pressure sensitive labels comprising:
 a main frame member having forward and rear surfaces;
 a first shaft extending from the upper central portion of said main frame member forward surface;
 a second shaft extending from the upper end portion of said main frame member forward section;
 a container having a drive motor and motor controls mounted therein;
 said container being releasably connected to said main frame member forward surface beneath said second shaft;
 said drive motor having a drive means projecting beyond the rear surface of said main frame member;
 a second frame member spaced away from said main frame forward surface by substantially the depth of said container so that said second frame member and the forward face of said container are substantially coextensive;

rod means extending between said main and second frame members to rigidly connect such frame members together;

a peeling blade having a relatively sharp forward edge;

said peeling blade being mounted between said main and said second frame members at the end of said main frame member opposite to that which carries said second shaft;

a rotatable drive roll extending between said frame members, said drive roll being disposed substantially beneath said first shaft;

a first idler roll disposed between said first and second shafts;

a second idler roll disposed adjacent said drive roll;

a plate member disposed between said frame members adjacent their lower edges, said plate member being in general alignment with said peeling blade;

said second shaft being adapted to carry a convolutely wound supply roll consisting of an elongated web having a series of pressure sensitive adhesive coated labels attached to said web at spaced locations therealong;

said web with said labels thereon being fed beneath said first idler roll and above said first shaft, said web at least partially following the curvature of said first shaft and passing substantially straight downwardly to pass around said second idler roll, then feeding substantially straight forwardly across the top of said plate member and across the top of said peeling blade;

said path of said web from said first shaft to said second idler roll being at an angle of substantially ninety degrees to the path of said web from said second idler roll to said peeling blade;

said web being passed across the sharp forward edge of said peeling blade, then reversed to pass rearwardly beneath said peeling blade and said plate member, around said drive roll and upwardly to rewind onto said first shaft;

said passage of said web across said sharp forward edge of said peeling blade causing the label to peel away from said web and continue feeding forwardly, while said empty web feeds reversely and rewinds onto said first shaft;

said drive roll having a portion extending beyond the rear surface of said main frame member;

a first driving means disposed rearwardly of said main frame member and connected between said drive means and said drive roll portion so that said drive motor can rotate said drive roll and hence move said web through the aforesaid path;

a second driving means connected between said drive roll portion and said first shaft to cause rotation of said first shaft in the same direction as rotation of said drive roll to thereby facilitate rewinding of said web; and web guiding means for assuring that the position of said web between said main and second frame members remains fixed as said web moves along its path.

19. A labelling machine as defined in claim 18 wherein said web guiding means includes:

a pair of spaced discs mounted on said second shaft on opposite sides of said supply roll;

a shaft extending between said frame members substantially above and slightly rearwardly of the rear end of said peeling blade;

a pair of guide members slidably mounted on said shaft and adapted to be positioned along the opposite side edges of said web.

20. A labelling machine as defined in claim 18 further including label sensing means comprising:

a shaft extending between said frame members above said plate member;

a housing slidably mounted on said shaft;

a microswitch mounted to said housing, said microswitch having a toe engageable with said labels and web as they pass across said plate member to sense the spacing between adjacent labels.

21. A labelling machine as defined in claim 18 further including mounting means comprising:

a block member having a pair of bores formed therethrough, said bores being offset ninety degrees from each other;

aligned aperture means formed in said main and second frame members;

a first mount tube projecting through said aligned aperture means and extending into one of said bores in said block;

a second mount tube projecting through the other bore in said block and adapted to be connected to a support;

a pair of clamps, one associated with each block bore, for clamping the mount tubes within said block bores.

22. A labelling machine as defined in claim 18 further including label applicator means comprising:

a cylinder and piston arrangement, including a downwardly projecting piston rod, mounted forwardly of said peeling blade;

a pad attached to the end of said piston rod, said pad having at least one aperture therein;

a vacuum source connected to said pad to draw a vacuum through said aperture for holding a label against the pad after the peeling blade has peeled the label away from said web; and fluid circuit means for said cylinder and piston arrangement to cause said piston to move said piston rod and hence said pad and label to a position where said label can transfer onto an object to be labelled;

said vacuum source being releasable to permit said label to release from said pad onto said object.

23. A labelling machine as defined in claim 18 further including label applicator means comprising:

a plate member having a roller mounted at the end thereof furthest from said peeling blade;

pivot mounting means connected with said plate member at the end thereof nearest peeling blade;

power means connected with said plate member for swinging said plate member about its pivot mounting means;

means causing a label being peeled away from said web by said peeling blade to traverse beneath said plate member toward said roller, with the adhesive surface of said label being directed away from said plate member;

said power means being operative to swing said plate member substantially when said lead end of said label reaches said roller, said swinging continuing until said label lead end contacts the object to be labelled whereupon continued motion of said object will cause said label to pass beneath said roller which will aid in applying said label to said object.

24. A labelling machine as defined in claim 22 wherein said label applicator means includes a gas pressure means directed toward the underside of said plate member to assist in causing said label to traverse beneath said plate member.

25. A labelling machine as defined in claim 22 further including aperture means in said plate member and a vacuum source connected with said aperture means to facilitate holding said label against said plate member during swinging movement thereof.

26. A labelling machine as defined in claim 18 further including a printing attachment for printing said labels while they remain attached to said web, said printing attachment including:

a striker bar located intermediate said first shaft and said second idler roller so that said web passes downwardly across and in front of said striker bar on its way to said peeling blade;

an ink pad and ink pad support disposed at an angle of substantially ninety degrees to said striker bar and spaced from said striker bar a sufficient distance so that said web with said labels thereon can pass between said striker bar and said ink pad support;

a movable type carrying shuttle member;

shuttle member operating means for causing said shuttle member to contact the type against said ink pad, then to swing through an angle of substantially ninety degrees to contact a selected label and to press the web behind said selected member against said striker bar, thereby imprinting said selected member.

27. A labelling machine as defined in claim 25 wherein said shuttle member operating means includes:
a fluid operated cylinder and piston arrangement, including an elongated piston rod; and
a toggle mechanism operatively connecting said piston rod to said shuttle member.

28. A labelling machine as defined in claim 26 wherein said shuttle member includes a base member upon which the type can be carried and a leg portion having a slot therein and wherein a fixed pin is provided to project through the slot in said leg portion.

29. A labelling machine as defined in claim 27 wherein said shuttle member operating means further includes:
a rotatably mounted rod disposed forwardly of said striker bar and above said ink pad support;
said rod being operatively connected with said toggle mechanism so that movement of said piston rod causes corresponding rotation of said rod;
a pair of spaced links fixed to and rotatable with said rod;
said links extending along opposite sides of said shuttle member; and
pins projecting inwardly from each of said links to engage within bores in said shuttle member.

References Cited
UNITED STATES PATENTS

| | | | |
|---|---|---|---|
| 3,301,733 | 1/1967 | West et al. | 156—584 |
| 3,450,590 | 6/1969 | LaMers | 156—584 |
| 2,687,819 | 8/1954 | Hill | 156—521 |
| 3,321,105 | 5/1967 | Marano | 156—584 |
| 3,560,309 | 2/1971 | Gruver et al. | 156—521 |
| 3,560,309 | 2/1971 | Ridenour et al. | 156—521 |

BENJAMIN A. BORCHELT, Primary Examiner

J. V. DORAMUS, Assistant Examiner

U.S. Cl. X.R.

156—521, 584